United States Patent Office 2,872,116
Patented Feb. 3, 1959

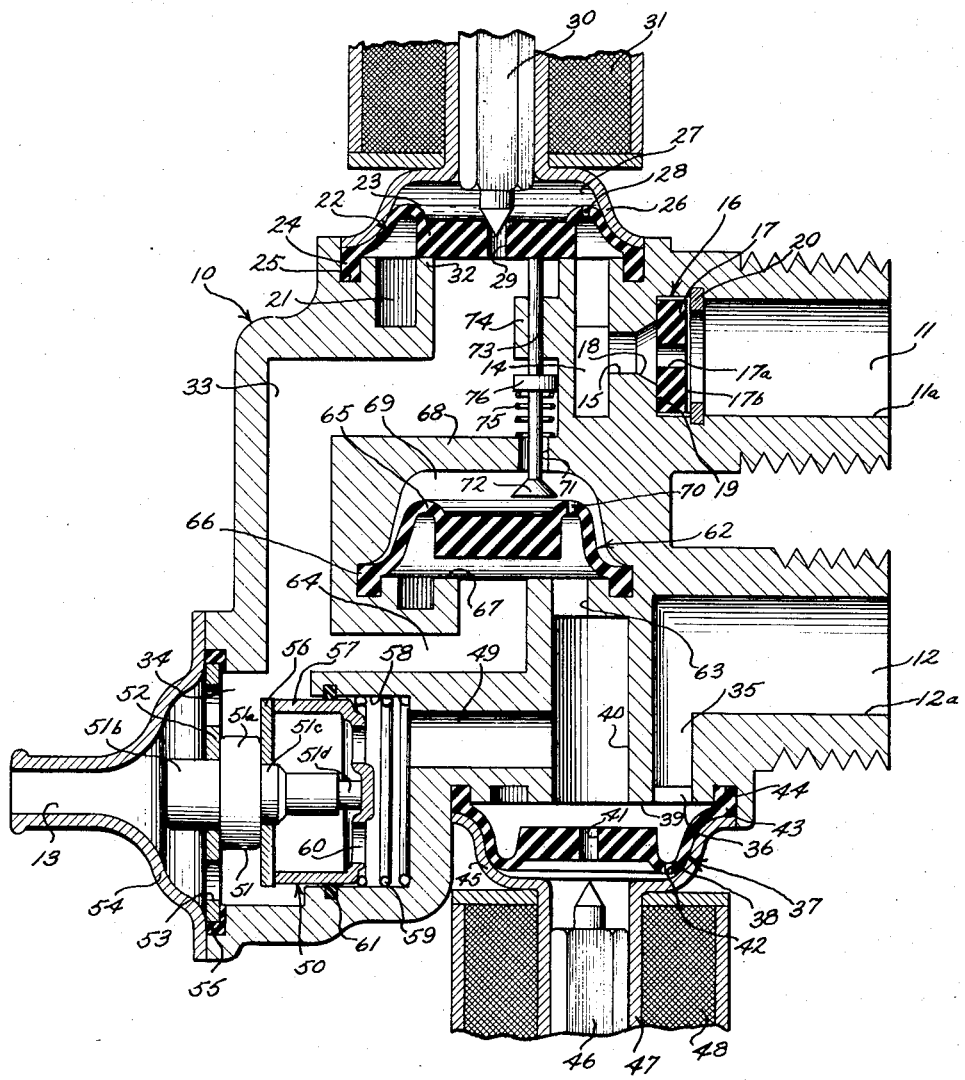

2,872,116

THERMOSTATIC MIXING VALVE ASSEMBLY

James A. Kozel and Victor E. Rimsha, Chicago, Ill., assignors to The Dole Valve Company, Chicago, Ill., a corporation of Illinois Application May 10, 1956, Serial No. 584,040

5 Claims. (Cl. 236—12)

This invention relates in general to improvements in fluid flow control devices, and more particularly to a valve assembly that receives hot and cold fluids and is capable of discharging a straight hot fluid, a straight cold fluid, or a mixture of hot and cold fluids that is controlled by a temperature responsive element. Thus, a mixing valve is provided for hot and cold fluids which is also capable of discharging a straight hot water supply or a straight cold water supply.

The valve assembly of the present invention includes a casing having hot and cold fluid inlets and an outlet. A pair of fluid-operated solenoid controlled diaphragm valves respectively control the admission of the hot and cold fluids to the casing. Energization of the respective solenoids open the corresponding diaphragm valves for admitting the fluids into the casing. A mixing chamber is provided in direct communication with the outlet on one side and the discharge side of the hot fluid diaphragm valve on the other side. Positioned in the mixing chamber is a temperature responsive element which actuates a metering valve having its discharge side in communication with the mixing chamber and its inlet side in communication with the discharge side of the cold fluid diaphragm valve. A bypass passageway is also provided which communicates at one end with the discharge side of the cold fluid diaphragm valve and at the other end with the mixing chamber. For regulating the flow of cold fluid through this bypass passageway, a pilot-operated diaphragm valve is provided which opens and closes respectively in response to the closing and opening of the hot fluid diaphragm valve. Energization of the solenoid associated with the hot fluid diaphragm valve opens its valve and allows straight through flow of hot fluid, while energization of the solenoid associated with the cold fluid diaphragm valve and deenergization of the hot fluid solenoid controlled diaphragm valve permits cold fluid flow through the bypass and opening of the pilot operated diaphragm valve to effect a cold fluid flow through the outlet. Energization of both solenoids opens both associated diaphragm valves and closes the pilot-operated diaphragm valve in the bypass. The hot fluid contacting the temperature responsive element causes it to actuate the metering valve and permit cold fluid to flow through the metering valve and ultimately provide a temperature controlled fluid.

Accordingly, it is an object of this invention to provide an improved flow control valve assembly having hot and cold fluid inlets and a single outlet, wherein a hot fluid supply, a cold fluid supply or a temperature controlled fluid supply may be obtained.

Another object of this invention resides in the provision of a mixing valve assembly having hot and cold fluid inlets and an outlet that is capable of providing a cold fluid or a hot fluid supply by utilizing only two fluid operated solenoid controlled diaphragm valves.

Still another object of this invention is in the provision of a mixing valve capable of providing a hot fluid supply, a cold fluid supply, or a hot and cold fluid mixture supply by selective energization of a pair of solenoids.

A further object of this invention is to provide a mixing valve assembly including a temperature responsive metering valve controlling the flow of cold fluid to the mixing chamber, and means for selectively bypassing the metering valve when it is desired to provide a cold fluid supply from the assembly.

A still further object of this invention is to provide a fluid mixing valve assembly including a hot fluid inlet controlled by a fluid-operated solenoid controlled diaphragm valve, a cold fluid inlet controlled by a fluid-operated solenoid controlled diaphragm valve, a mixing chamber, a temperature responsive metering valve controlling the flow of cold fluid to the mixing chamber, and a bypass around the metering valve having a pilot-operated diaphragm valve therein actuated by the hot fluid diaphragm valve, wherein a hot fluid supply, a cold fluid supply, or a temperature controlled fluid supply may be obtained.

Other objects, features, and advantages of the invention will be apparent from the following detailed disclosure, taken in conjunction with the accompanying sheets of drawings, wherein like reference numerals refer to like parts, in which:

On the drawings:

The figure is a partially fragmentary sectional view taken through the valve assembly of the instant invention, showing some parts in elevation.

As shown on the drawings:

The mixing valve of the present invention includes a casing for housing, generally indicated by the numeral 10, having a hot fluid inlet 11, a cold fluid inlet 12, and a single outlet 13. While the present invention may be utilized with any type of hot and cold fluids, it will generally be employed in connection with controlling the flow of hot and cold water.

The inlets 11 and 12, in this case, are defined by laterally projecting hollow cylindrical portions in spaced relation, having axial bores 11a and 12a, respectively, and being externally threaded for connection to fluid conveying elements, such as pipes or conduits. The hot fluid inlet 11 will, of course, be connected to a pressurized source of hot fluid, while the cold fluid inlet 12 will be connected to a pressurized source of cold fluid.

The hot fluid, entering the casing, passes into an inlet passageway 14 through a diametrically reduced bore 15. A flow control device, generally designated by the numeral 16 is positioned ahead of the bore 15 and serves to maintain a substantially constant rate of fluid flow irrespective of wide variations in fluid pressure.

This flow control device includes an elastic or flexible disk 17 having an axial orifice 17a therein of smaller size than the bore 15. The inlet end of the bore 15 is beveled to provide a frusto-conical surface 18 which merges with an annular flat shoulder 19 at the inner end of the inlet bore 11a. The elastic disk is maintained in position by a suitable split retainer ring 20 which is received within a groove formed in the bore 11a. The elastic disk 17 may be constructed of any suitable elastic material, such as rubber, synthetic rubber or the like, and it is noted that the orifice 17a is considerably smaller than the inner marginal edge of the shoulder 19 in order to provide an inwardly projecting portion beyond this marginal edge.

When fluid is passed through the flow control device or valve 16, the pressure of the fluid upon the upper face 17b of the disk 17 causes the elastic material in the region of the orifice 17a to be distorted, a portion of it being forced downwardly into the beveled end of the bore 15. This distortion of the disk 17 causes the inlet end of the orifice 17a to be reduced in size or cross-sectional area according to the pressure of the fluid on the upper surface 17b. Thus, the effective opening of the orifice 17a is automatically varied by the fluid pressure delivered to the flow control device so as to maintain a substantially constant rate of flow irrespective of the pressure of the fluid delivered thereto.

From the inlet passage 14, the hot fluid flows upwardly into an annular passage or chamber 21 and to the inlet side of a fluid-operated solenoid controlled diaphragm valve 22. This valve includes a flexible diaphragm 23 having a marginal bead 24 seated in an annular slot or groove 25 of the housing. A bell-shaped member 26 overlies the marginal bead of the diaphragm 23 and retains it in place on the housing. The cover member 26 defines with the upper face of the diaphragm 23 a fluid chamber 27 which receives fluid from the annular inlet passageway 21 through an orifice or a bleed hole 28. In order to open and close the diaphragm valve 22, fluid pressure is either built up or released in the fluid chamber 27 by the opening and closing of a pilot port 29 extending axially through the center of the diaphragm 23. This port is selectively opened and closed by the conical end of a pilot plunger 30. Notably, the pilot port 29 is much larger than the orifice 28.

The diaphragm 23 may be constructed of any suitable resilient material, such as a rubber-like material or a synthetic plastic material. The pilot plunger 30 also serves as an armature of a solenoid which includes a coil 31 encircling the plunger. For this reason, the portion of the pilot plunger serving as the armature is preferably constructed of a magnetically responsive material having a relatively high permeability and low coercive force. While not shown, it will be understood that electrical leads are connected to the solenoid and to a power source which may be selectively operated to energize the coil 31. As illustrated in the figure, the coil 31 is deenergized and any suitable biasing means, such as a spring, although not shown, is provided to bias the pilot plunger 30 into closed position with respect to the pilot port 29 of the diaphragm 23 which ultimately closes the diaphragm valve 22.

In operation of this diaphragm valve, energizing the solenoid coil 31 lifts the pilot plunger 30 to open the pilot port 29. The pilot port 29 being larger than the orifice 28 allows the pressure on the top of the diaphragm to be reduced rapidly to permit the line pressure from within the annular passageway 21 to push against the bottom side of the diaphragm and lift it to full open position. When the solenoid coil 31 is deenergized, the pilot plunger 30 closes the pilot port 29. The line pressure of the fluid passes through the orifice 28 to act on the upper side of the diaphragm 23 or the side contiguous to the pilot plunger 30 and force the diaphragm valve downwardly into tight seating position against an annular valve seat 32 on the discharge side of the diaphragm valve and which leads to an angular passageway 33. Closing of the diaphragm valve 29 takes place since the surface area exposed to the fluid pressure on the upper side of the diaphragm 23 exceeds the surface area exposed to the fluid pressure on the underside thereof within the annular passageway 21.

The discharge passageway 33 of the diaphragm valve 22 leads to a mixing chamber 34 which is in direct communication with the valve outlet 13.

The cold fluid inlet bore 12a communicates with a downwardly extending passageway 35, which in turn, communicates with an annular passageway 36. This annular passageway leads to the inlet side of a fluid-operated solenoid controlled diaphragm valve 37 which is constructed similarly to the diaphragm valve 22.

This diaphragm valve also includes a flexible diaphragm 38 adapted to coact with an annular valve seat 39 which leads to an inlet passageway 40. The diaphragm 38 includes an axially extending, centrally positioned pilot port 41, an offset orifice or bleed hole 42 smaller in size than the pilot port 41, and a peripheral or marginal bead 43 seated in an annular slot 44 of the casing 10. A bell-shaped cover member 45 overlies the diaphragm marginal bead and retains it in place with respect to the casing. Coacting with the pilot port 41 is the upper conical end of a pilot plunger 46 slidable in a guide member 47 and also serving as an armature of a solenoid which includes a coil 48 encircling the guide member 47. As shown on the figure, the coil 48, which will be connected to suitable lead lines and a power source (not shown), is energized to position the conical end thereof out of contact with the diaphragm pilot port 41 and allow the diaphragm valve 37 to be in fully open position. With respect to the pilot plunger 30 of the diaphragm valve 22, a suitable biasing means, such as a spring will be employed in connection with the pilot plunger 46 to maintain its conical end in contact with the diaphragm 38 when the solenoid is deenergized. Since the operation of this diaphragm valve 37 is identical with that of the diaphragm valve 22, a detailed description of this operation need not be set forth.

Leading from the cold fluid inlet 40 and at the discharge side of the diaphragm valve 37 is a passageway 49 which communicates with the inlet side of a metering valve 50. This metering valve includes a temperature responsive device 51 in the form of a thermo-power element having a large cylindrical center portion 51a, a rearwardly extending diametrically reduced portion 51b, a forwardly extending diametrically reduced portion 51c, and a thrust transmitting member or piston 51d. The rearwardly extending portion 51b is received in a centrally apertured disk 52 with the rear face of the enlarged center portion 51a bearing against one side thereof, thereby allowing the rear portion 51b which houses the temperature sensitive material of the thermal power element to project into a passageway leading through the outlet 13. Thus, the thermal power element 51 will respond to the temperature of the fluid passing to the outlet 13.

In order to communicate the outlet 13 with the mixing chamber 34, a plurality of angularly arranged openings 53 are provided in the supporting disk member 52. To hold the disk 52 in position, a bell-shaped cover member 54, which defines the outlet 13, is suitably secured to the casing 10 in sealing relationship with the aid of a resilient sealing member 55.

Received on the forwardly extending portion 51c of the thermal power element is a centrally apertured circular plate 56 which functions as a valve seat, and coacts with the open end of a cup-shaped valve member 57 that is slidably received in an enlarged bore 58 of the casing that communicates with the passageway 49. The thrust transmitting member 51d of the thermal power element 51 bears against the inside surface of the bottom of the valve member 57 and serves to force it against the bias of a spring 59 towards the passageway 49 to unseat the valve member from the valve seat 56. In order to provide fluid flow through the valve member 57, a plurality of annularly arranged ports or openings 60 are located in the bottom of the valve member 57. An annular seal 61 is received in a groove of the bore 58 to coact with the outer cylindrical surface of the cup-shaped valve member 57 and prevent leakage of fluid along the outside of the valve member. Thus, flow of cold fluid from the inlet passageway 49 to the mixing chamber 34 is allowed only when the thermal power element 51 responds to a predetermined temperature and unseats the valve member 57 from the valve seat 56.

The thermal power element 51, may, by way of example, be of the same general type as shown and described in the Vernet Patent No. 2,368,181, issued on January 30, 1945. The particular utility of this type of power element is the relatively high power developed and the compactness of the assembly.

In order to bypass the metering valve 50, a pilot operated diaphragm valve, generally indicated by the numeral 62, is provided which communicates on its inlet side with an annular passageway 63 that is connected to the inlet passageway 40, and on its discharge side with an angular passageway 64 leading to the mixing chamber 34. This diaphragm valve includes a flexible diaphragm 65 overlying the annular passageway 63 and the inlet to the bypass passageway 64, and having a marginal bead 66 suitably held by the casing. An annular valve seat 67 is provided at the inlet end of the bypass passageway 64 to coact with the central portion of the diaphragm 65 in controlling the flow of fluid between the annular passageway 63 and the bypass passageway 64.

The casing is provided with an overhead wall or partition 68 which communicates with the upper side of the diaphragm 65 and defines a fluid chamber 69 therebetween which serves to operate the movement of the diaphragm 65. An orifice or bleed hole 70 provides communication between the annular inlet passageway 63 and the fluid chamber 69. A pilot port 71 extending through the upper casing partition 68 and being larger in size than the orifice 70 is selectively opened and closed by a conical member 72 for selectively opening and closing the diaphragm valve 62. Movement of the conical member 72 is provided by a vertically upwardly extending stem 73 connected to the conical member, which extends upwardly through the pilot port 71 and is slidably guided in a boss portion 74 of the casing 10. The stem 73 is normally biased upwardly to close the pilot port 71 by a spring 75 bearing on one end against the upper partition 68 and on the other end against a collar member 76 secured to the stem.

In the position shown in the figure, the diaphragm valve 22 is closed, thus forcing downward the stem 73 and its connected conical member 72 to open the pilot port 71 thereby allowing the fluid in the chamber 69 to be discharged through the pilot port 71 faster than it can possibly enter the smaller size orifice 70 in the diaphragm 65. Thus, the line pressure will force the diaphragm valve upwardly to its fully open position and allow communication between the bypass passageway 64 and the inlet passageway 40. In this position, with the cold fluid diaphragm valve 37 in its open position, the metering valve 50 will be closed as shown and flow of cold fluid from the inlet 12, through the bypass passageway 64, and to the outlet 13 will take place.

When it is desired to have a straight hot fluid flow through the valve, the coil 31 is energized to lift the plunger 30 and open the diaphragm valve 22, and the coil 48 is deenergized to allow the pilot plunger 46 to contact and close the pilot port 41 in the cold fluid diaphragm valve 37. Hence, the cold fluid valve 37 will be closed to preclude the entrance of any cold fluid into the valve casing 10.

In order to provide a temperature controlled fluid, both coils 31 and 48 are energized to move the pilot plungers 30 and 46 out of contact with the pilot ports 29 and 41, respectively. This will cause opening of the diaphragm valves 22 and 37, while closing the pilot-operated diaphragm valve 62. Subsequently, the thermal power element 51 will be actuated by the higher temperature fluid and open the valve 50 to meter cold fluid flowing to the mixing chamber 34. Hence, when both solenoids have been energized, a controlled temperature fluid will be discharged from the outlet 13.

From the foregoing, it is seen that the instant invention provides a mixing valve which is capable of producing a hot fluid flow, a cold fluid flow, or a mixed fluid flow that is temperature controlled by the selected energization of the pair of solenoids.

It will be understood that modifications and variations may be effected without departing from the scope of the novel concepts of the present invention, but it is understood that this application is to be limited only by the scope of the appended claims.

We claim as our invention:

1. In a valve assembly including a casing having a hot fluid inlet, a cold fluid inlet, and an outlet, a fluid mixing chamber leading to said outlet, a fluid-operated solenoid controlled diaphragm valve communicating at its inlet side with said hot fluid inlet and at its discharge side with said mixing chamber, a second fluid-operated solenoid controlled diaphragm valve communicating at its inlet side with said cold fluid inlet and at its discharge side with said mixing chamber through two separate passageways, means in one passageway responsive to the fluid temperature at the outlet for metering the cold fluid flow thereto, and a pilot-operated diaphragm valve in said other passageway responsive to closing and opening of said hot fluid diaphragm valve for respectively opening and closing said other passageway.

2. In a valve assembly including a casing having a hot fluid inlet, a cold fluid inlet, and an outlet, a fluid mixing chamber leading to said outlet, a fluid-operated solenoid controlled diaphragm valve communicating at its inlet side with said hot fluid inlet and at its discharge side with said mixing chamber, a second fluid-operated solenoid controlled diaphragm valve communicating at its inlet side with said cold fluid inlet and at its discharge side with said mixing chamber through two separate passageways, a metering valve in one passageway responsive to the fluid temperature at the outlet for regulating the cold fluid flow to said mixing chamber, and a pilot-operated diaphragm valve in said other passageway responsive to closing and opening of said hot fluid diaphragm valve for respectively opening and closing said other passageway.

3. In a valve assembly including a casing having a hot fluid inlet, a cold fluid inlet, and an outlet, a fluid mixing chamber leading to said outlet, a fluid-operated solenoid controlled diaphragm valve communicating at its inlet side with said hot fluid inlet and at its discharge side with said mixing chamber, a second fluid-operated solenoid controlled diaphragm valve communicating at its inlet side with said cold fluid inlet and at its discharge side with said mixing chamber through two separate passageways, a metering valve in one passageway having a thermal power element responsive to the fluid temperature at the outlet for regulating the cold fluid flow to said mixing chamber, and a pilot-operated diaphragm valve in said other passageway responsive to closing and opening of said hot fluid diaphragm valve for respectively opening and closing said other passageway.

4. In a valve assembly including a casing having a hot fluid inlet, a cold fluid inlet, and an outlet, a fluid mixing chamber leading to said outlet, a fluid-operated solenoid controlled diaphragm valve communicating at its inlet side with said hot fluid inlet and at its discharge side with said mixing chamber, a second fluid-operated solenoid controlled diaphragm valve communicating at its inlet side with said cold fluid inlet and at its discharge side with said mixing chamber through two separate passageways, a metering valve in one passageway having a thermal power element responsive to the fluid temperature at the outlet for regulating the cold fluid flow to said mixing chamber, and a pilot-operated diaphragm valve in said other passageway having pilot means opening and closing, respectively, in response to closing and opening movement of said hot fluid diaphragm valve.

5. In a valve assembly including a casing having a hot fluid inlet, a cold fluid inlet, and an outlet, a fluid mixing chamber leading to said outlet, a fluid-operated solenoid controlled diaphragm valve communicating at its inlet side with said hot fluid inlet and at its discharge side with said mixing chamber, a second fluid-operated solenoid controlled diaphragm valve communicating at its inlet side with said cold fluid inlet and at its discharge side with said mixing chamber through two separate passageways, a metering valve in one passageway having a thermal power element responsive to the fluid temperature at the outlet for regulating the cold fluid flow to said mixing chamber, and a pilot-operated diaphragm valve in said other passageway having pilot means connected to the hot fluid diaphragm for movement therewith which respectively opens and closes said other passageway when said hot fluid diaphragm assumes closed and opened positions.

References Cited in the file of this patent

UNITED STATES PATENTS

| | | |
|---|---|---|
| 2,280,667 | Scott et al. | Apr. 21, 1942 |
| 2,296,266 | Breckenridge | Sept. 22, 1942 |
| 2,326,096 | Dillman | Aug. 3, 1943 |
| 2,453,409 | Chace | Nov. 9, 1948 |
| 2,647,692 | Keller et al. | Aug. 4, 1953 |
| 2,768,791 | Frey | Oct. 30, 1956 |